United States Patent [19]
Stewart, Jr.

[11] Patent Number: 5,649,746
[45] Date of Patent: *Jul. 22, 1997

[54] SELF-PURGING VEHICLE BRAKING SYSTEM AND METHOD OF PURGING GAS FROM SAME

[76] Inventor: Howard C. Stewart, Jr., 813 E. Farris Ave., High Point, N.C. 27262

[*] Notice: The term of this patent shall not extend beyond the expiration date of Pat. No. 5,350,223.

[21] Appl. No.: 272,235

[22] Filed: Jul. 8, 1994

Related U.S. Application Data

[63] Continuation-in-part of Ser. No. 14,700, Feb. 8, 1993, Pat. No. 5,350,223.

[51] Int. Cl.$^6$ ................................................. B60T 15/00
[52] U.S. Cl. ......................... 303/84.7; 188/351; 188/71.6
[58] Field of Search .................... 303/84.2, 68; 188/351, 188/151 A, 352; 60/591; 137/854

[56] References Cited

U.S. PATENT DOCUMENTS

| | | | |
|---|---|---|---|
| 2,742,982 | 4/1956 | Helmbold. | |
| 2,805,737 | 9/1957 | Griffin | 60/591 |
| 3,037,522 | 6/1962 | Milan | 137/854 |
| 3,204,413 | 9/1965 | Pace. | |
| 3,385,062 | 5/1968 | Cadmus | 188/351 |
| 3,420,342 | 1/1969 | Botterill. | |
| 3,439,500 | 4/1969 | Hertell. | |
| 3,760,912 | 9/1973 | Braun. | |
| 4,014,410 | 3/1977 | Bryant. | |
| 4,132,241 | 1/1979 | Iannelli. | |
| 4,373,333 | 2/1983 | Coleman. | |
| 4,799,575 | 1/1989 | Kroniger | 188/71.6 |
| 5,350,223 | 9/1994 | Stewart, Jr. | 303/84.2 |

OTHER PUBLICATIONS

"Wildwood Self Bleeding Brake Fluid System," Brochure dated Mar. 23, 1993.

*Primary Examiner*—Matthew C. Graham
*Attorney, Agent, or Firm*—Allen, Dyer, Doppelt, Franjola & Milbrath, P.A.

[57] ABSTRACT

A self-purging vehicle braking system and method of purging gas from same are provided by the present invention. The braking system preferably includes a disk brake and a master cylinder in fluid communication with the disk brake. The master cylinder preferably has a piston chamber, a piston disposed within the piston chamber and moveable between an extended and a retracted position which defines a working volume of fluid moved by the piston, and a fluid reservoir in fluid communication with the piston chamber and adapted to supply fluid thereto. A manifold connects in fluid communication with the piston chamber and the disk brake. An inlet brake line interconnects the manifold to the disk brake for supplying brake fluid to the disk brake, and an outlet brake line interconnects the disk brake to the manifold for returning fluid from the disk brake. A flow controller connects in fluid communication with the inlet and outlet brake lines to control fluid flow during operation of the braking system. The manifold has a predetermined volume less than the working volume of the piston so that the master cylinder withdraws the working volume of hydraulic fluid from the manifold and the outlet brake line when the piston moves from the extended to the retracted position so as to collect a portion of the fluid from the outlet brake line in the piston chamber and thereby permit gas contained therein to vent through the fluid reservoir.

7 Claims, 7 Drawing Sheets

Fig. 12A.
NEUTRAL POSITION

Fig. 12B.
PRESSURE STROKE

Fig. 12C.
RETURN STROKE

FIG. 13.

SELF-PURGING VEHICLE BRAKING SYSTEM AND METHOD OF PURGING GAS FROM SAME

RELATED APPLICATIONS

This application is a continuation-in-part of U.S. patent application Ser. No. 08/014,700 filed on Feb. 8, 1993,now U.S. Pat. No. 5,356,223.

FIELD OF THE INVENTION

This invention relates to braking systems for vehicles and more particularly to braking systems having brake fluid circulating through the braking system to cool the brakes of such systems.

BACKGROUND OF THE INVENTION

Various types of brakes, such as electric, air, drum, and disk, have been developed for various types of vehicles and uses. Air brakes, for example, are commonly used on heavy-duty trucks. Drum brakes have been commonly used on other automobiles where such heavy loads are not involved, but federal laws requiring disk-type brakes on new cars have caused the disk-type brake to become more popular. Disk-type brakes are usually less subject to water fading and are typically more resistant to heat fading due to high speed or repeated stops than drum brakes. Also, disk-type brakes are capable of straight-line stops so that hard braking effort usually does not cause the automobile to pull to the right or to the left.

Although disk brakes have several advantages over drum brakes, problems have also been discovered during some uses of disk brakes. For example, when this type of brakes are used with cars enduring high speeds over a long period of time, such as with race cars, the brake pedal often develops a spongy feeling or brake fade which reduces the brakes' effectiveness and produces less than optimum braking action. The spongy feeling in the brake pedal is typically caused by boiling hydraulic fluid, water, or the like in and around the brake caliper. The boiling hydraulic fluid, in turn, is caused by the heat generated from the application of the brakes at high speeds.

Some attempts to solve this problem have included forcing air into the caliper area or circulating water through the caliper area to keep the fluid from boiling. These attempts, however, have failed because of the lack of understanding of the braking system operation.

Other attempts recognized that some of the brake fade is caused by the brake fluid remaining in the caliper. Therefore, attempts to solve the problem based on this recognition have arranged check valves either within or closely adjacent the disk brakes to allow fluid to circulate through the brake caliper. An example of such a disk brake may be seen in U.S. Pat. No. 4,799,575 by Kroniger titled "Hydraulically Controlled Disk Brake With Serial Fluid Flow." These and other attempts, however, likewise failed because they failed to recognize the need to provide a path for purging air from the brakes and the brake lines and failed to recognize the residual pressure problems related to such braking systems.

Thus, there is a need for a braking system that provides circulation of fluid through the brake caliper and purges the brake lines of air or gas therein.

SUMMARY OF THE INVENTION

It is therefore an object of the present invention to provide a vehicle braking system for self-purging and removal of gas from the brake lines to thereby prevent the accumulation of gas or air therein so as to provide a more effective braking system.

It is also an object of the present invention to provide a circulation path for gas in and around the brakes and brake lines of a braking system of a vehicle.

It is a further object of the present invention to provide a circulation path for braking fluid in a braking system to circulate through brake calipers of disk brakes in a braking system to enhance the cooling of the disk brakes.

More particularly, the braking system preferably includes a hydraulically operated disk brake generating heat during operation thereof and a master cylinder in fluid communication with the disk brake. The master cylinder preferably includes a piston chamber, a piston disposed within the piston chamber and moveable between an extended and a retracted position and defining a working volume of fluid moved by the piston, and a fluid reservoir in fluid communication with the piston chamber and adapted to supply fluid thereto.

The braking system also includes connecting means, such as a manifold, for connecting the disk brake in fluid communication with the piston chamber. An inlet brake line interconnects the manifold to the disk brake for supplying brake fluid to the disk brake, and an outlet brake line interconnects the disk brake to the manifold for returning fluid from the disk brake. During heavy use of the disk brake, the returning fluid generally has gas therein produced by heat from operation of the disk brake.

The brake system further preferably includes flow control means connected in fluid communication with the inlet and outlet brake lines for controlling fluid flow so as to circulate flow from the disk brake to the piston chamber from the outlet brake line during operation of the braking system. The connecting means, i.e., manifold, preferably has a predetermined volume less than the working volume of the piston so that the master cylinder withdraws the working volume of hydraulic fluid from the manifold and the outlet brake line when the piston moves from the extended to the retracted position so as to collect a portion of the returning fluid from the outlet brake line in the piston chamber and thereby permit gas contained therein to vent through the fluid reservoir.

According to an embodiment of the invention, a master cylinder is provided including a housing, a piston chamber positioned within the housing, and a piston disposed within the piston chamber. The master cylinder also preferably has a first port in the housing adapted for connecting an inlet brake line thereto and a second port in the housing adapted for connecting an outlet brake line thereto. A manifold is positioned within the housing and connects the piston chamber in fluid communication with the first and second ports. Flow control means is preferably disposed in fluid communication with the piston chamber and the inlet and outlet ports and positioned within the housing of the master cylinder for controlling fluid to flow therethrough in only one direction through either the inlet or outlet ports from the respective inlet or outlet brake lines connected thereto. The flow control means also preferably provides a residual pressure in the respective inlet or outlet brake line of less than about 1 lb./in$^2$.

A method of purging gas from the brake lines of a vehicle according to the present invention preferably has the steps of providing a brake line in fluid communication with a master cylinder and an upper portion of a caliper of a disk brake and providing a check valve in fluid communication with the brake line. Fluid is then preferably circulated through the caliper of the disk brake so that fluid from the upper portion of the caliper returns to the brake line. Gas, air, or the like is urged from in and around the caliper through the brake line to the master cylinder and to a fluid reservoir in communication therewith during operation of the disk brake.

BRIEF DESCRIPTION OF THE DRAWINGS

Some of the objects and advantages of the present invention having been stated, others will become apparent as the description proceeds when taken in conjunction with the accompanying drawings, in which.

DETAILED DESCRIPTION OF THE ILLUSTRATED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein; rather, the embodiments are provided so that this disclosure will be thorough and complete and will fully convey the scope of the invention to those skilled in the art. Like numbers refer to like elements throughout.

Figure 1:
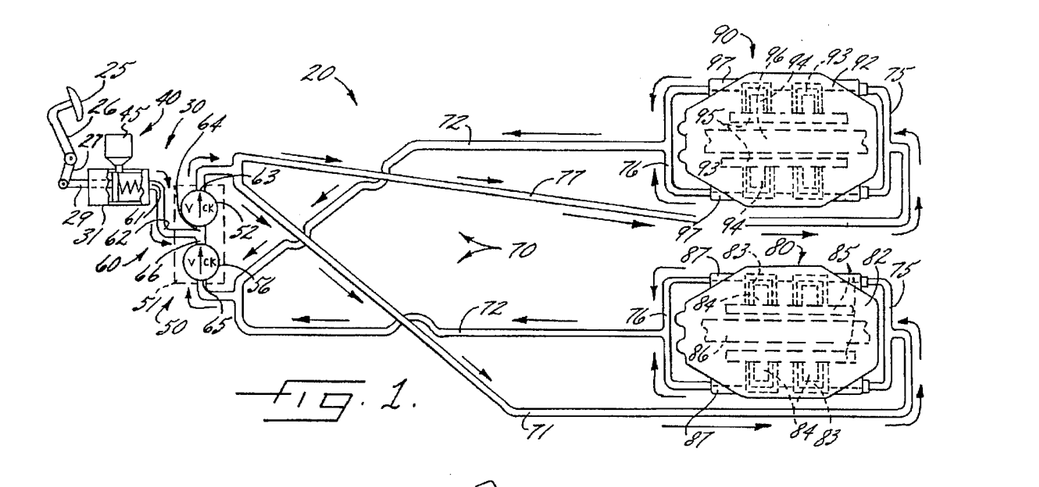
FIG. 1 is a schematic view of a vehicle braking system for a pair of disk brakes according to a first embodiment of the present invention.

In reference to the drawings, FIG. 1 is a schematic view of a vehicle braking system 20 according to a first embodiment of the present invention also illustrating fluid flow by directional arrows. As shown in FIGS. 1–13, the vehicle braking system 20 according to the present invention is particularly characterized by being constructed for self-purging and removal of gas from the brake lines 70 to thereby prevent the accumulation of gas or air therein so as to provide a more effective braking system 20. Self-purging or removal of gas in a braking system of a vehicle would include the purging and removal of various gases, including air or the like, from the brake calipers, generally designated at 82, 92, and brake lines 70, whether the gas is trapped in the system 20 from installation or the like or from fluid, such as water or brake fluid, within the system 20, changing phases, such as from a liquid to a vapor, during heating thereof.

Figure 2:
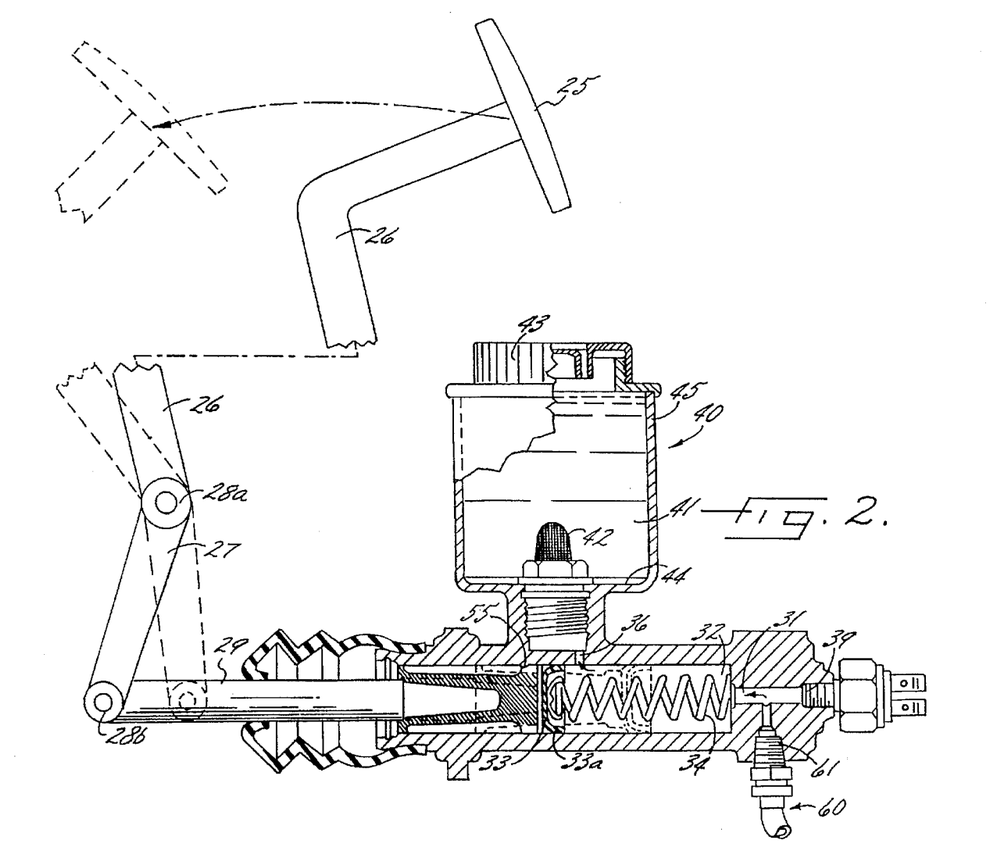
FIG. 2 is a vertical cross-sectional view of a master cylinder including a fluid reservoir and having a brake pedal connected thereto according to a braking system of the present invention.

The braking system 20 of the present invention preferably has a master cylinder, such as the master cylinder 30 best shown in cross-section in FIG. 2 or the other various embodiments illustrated, which preferably includes a fluid reservoir 40 for supplying brake fluid to the braking system 20. The system 20 also preferably has at least one disk brake 80, 90. Although the invention includes vehicles having at least one disk brake (such as the passenger vehicle disk brake 80' shown in FIG. 8), the system 20 of the invention is illustrated schematically in the drawings for vehicles having two disk brakes, such as the front right and front left disk brakes 80, 90 of a racing vehicle or the like. More than two disk brakes, however, may also be used with a braking system 20 of the invention such as the four disk brakes illustrated in co-pending U.S. patent application Ser. No. 08/014,700 filed on Feb. 8, 1993 by the same inventor which is also hereby incorporated herein in its entirety by reference.

Figure 13:
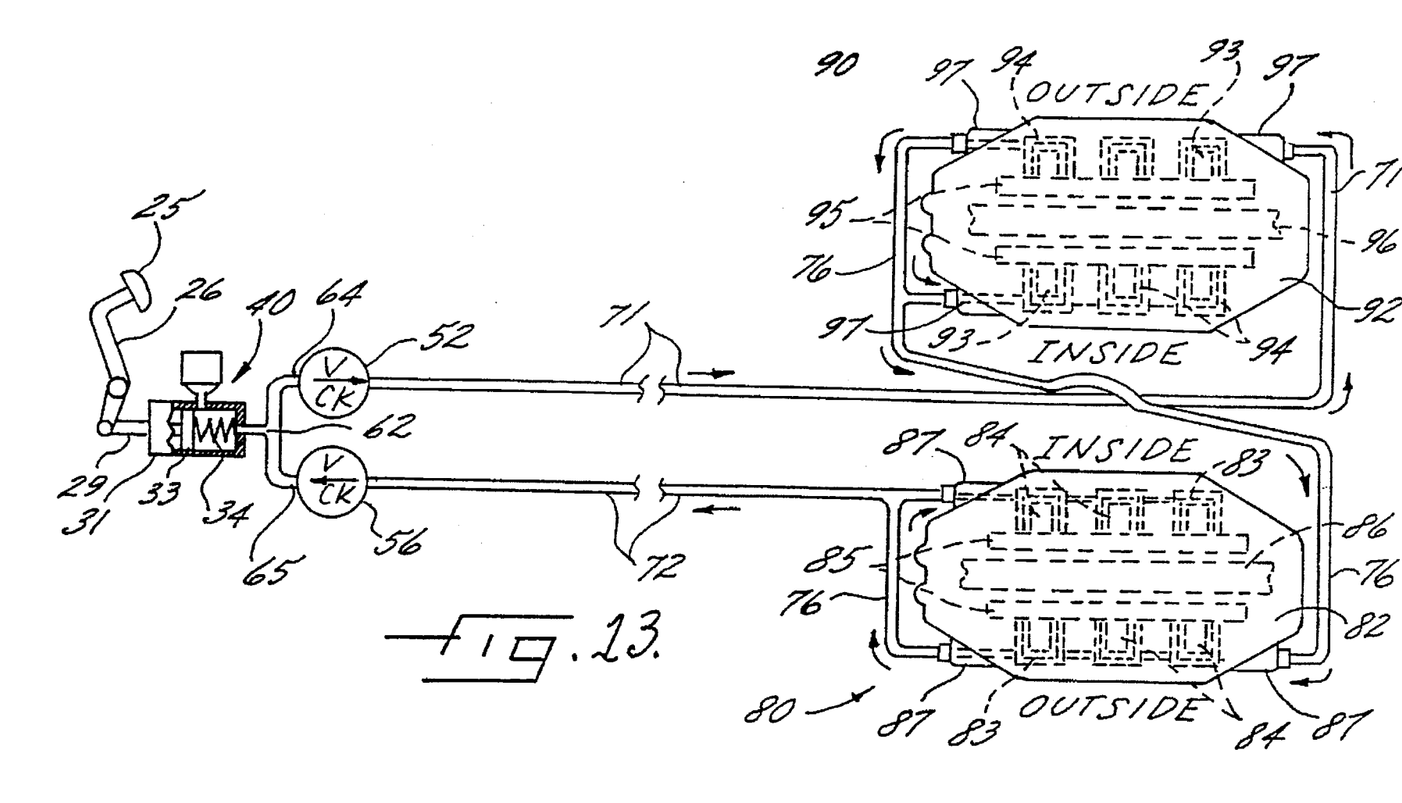
FIG. 13 is a schematic view of a braking system according to a tenth embodiment of the present invention.

As further shown in FIG. 1, the disk brakes 80, 90 are preferably hydraulically controlled and each have a caliper 82, 92 including a plurality of piston chambers, such as cylinders 83, 93, and a plurality of respective hydraulically operable brake pistons 84, 94 guided in the cylinders 83, 93. Although the embodiment of FIG. 1 illustrates four cylinders 83, 93 and pistons 84, 94 positioned with the calipers 82, 92 and the embodiment of FIG. 13 illustrates six cylinders 83, 93 and pistons positioned with the calipers 82, 92, each caliper 82, 92 preferably has least two cylinders 83, 93 and respective brake pistons 84, 94 positioned therein. An inlet brake line 71 interconnects the master cylinder 30 to the calipers 82, 92 for supplying brake fluid to the calipers 82, 92 and an outlet brake line 72 also interconnects the master cylinder 30 to the calipers 82, 92 for receiving brake fluid from the calipers 82, 92.

Figure 8:
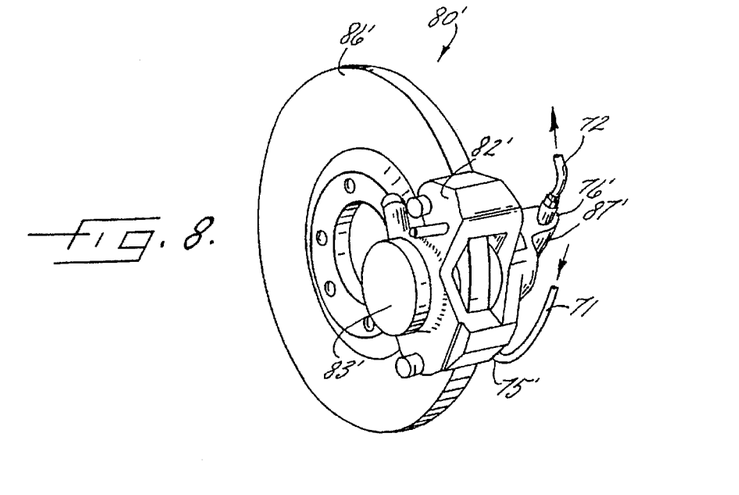
FIG. 8 is a perspective view of a passenger vehicle disk brake of a braking system according to the present invention.

FIG. 8 is a perspective view of a passenger vehicle disk brake 80' of a braking system 20 according to the present invention. This disk brake 80' has a caliper 82' including a pair of cylinders 83' positioned on respective sides of the rotor 86'. A brake piston 84' is also positioned within each of the cylinders 83 and cooperates with a brake pad (not shown) to thereby interact with the rotor 86'. Although passenger vehicles often do not have the magnitude of the problems such as brake fade and overheating of the brakes unless heavily used at high speeds, the present invention includes applications to such vehicles as well.

This perspective view of a disk brake 80' in FIG. 8, however, illustrates a preferred connecting configuration of the inlet and outlet brake lines 71, 72 with the brake caliper 82'. As illustrated, the inlet brake line 71 preferably connects to a lower portion 75' of the caliper 82' and the outlet brake line 72 preferably connects to an upper portion 76' of the caliper 82'. This particular configuration of the brake lines 70 with respect to the caliper 82' provides a fluid path that anticipates the tendency of gas or air in and around the caliper 82' and the brake lines 70 to be urged upward, i.e., rise, through the brake lines 70 to further assist the purging of the gas or air from the braking system 20.

The master cylinder 30 of the braking system 20, such as illustrated in FIG. 2, preferably includes a housing 31 having a piston chamber 32 and a piston 33 disposed within the piston chamber 32 and moveable between an extended and a retracted position (illustrated in phantom view). The movement of the piston 33 within the piston chamber 32 generally defines a working volume of fluid moved by the piston 33. The piston 33 preferably has a lip seal 33a or the like positioned on the peripheral edges thereof and closely adjacent inner walls 32a of the piston chamber 32.

The master cylinder 30 also preferably includes at least one brake line port 37 and a retraction spring 34 positioned in the piston chamber 32 and between the piston 33 and the brake line port 37. The spring 34 maintains the piston 33 in a retracted position when pressure is not being applied to a brake pedal 25 of the vehicle. The illustrated embodiment of a master cylinder 30 in FIG. 2 also has a brake light sensor port 39 that senses fluid pressure caused by actuation of the brake pedal 25. The sensed fluid pressure then activates typical brake lights of a vehicle, i.e., rear brake lights. Other embodiments of the master cylinder 30 may include first and second brake line ports 37, 38 (FIGS. 6–7 and FIGS. 9–13) in fluid communication with the piston chamber 32 and inlet and outlet brake lines 71, 72.

The master cylinder 30 further preferably includes a fluid reservoir 40 in fluid communication with the piston chamber 32. The fluid reservoir 40 preferably has a housing 45 and a main fluid chamber 41 positioned therein. Brake fluid positioned in the main fluid chamber 41 of the reservoir 40 preferably passes through a main fluid reservoir port 35 connecting a lower portion 44 of the main fluid chamber 41 to the piston chamber 32 of the master cylinder 30. A compensating port 36 also preferably connects the lower portion 44 of the main fluid chamber 41 to the piston chamber 32. As described, the connection of the main fluid reservoir port 35 and the compensating port 36 to the piston chamber 32 are such that the ports 35, 36 are preferably positioned in fluid communication with the piston chamber 32 and the main fluid chamber 41 of the fluid reservoir 40.

The braking system 20 also includes flow control means, such as a flow controller generally designated at 50, preferably having first and second valve means. The first and second valve means are shown in the form of a pair of respective check valves 52, 56 associated with and in fluid communication with the inlet brake line 71 and outlet brake line 72. The flow controller 50 of a first embodiment, illustrated in FIG. 1 by phantom view, additionally has a housing 51 with the first and second check valves 52, 56 positioned therein. An example of the construction of a first embodiment of the flow controller 50 is also further illustrated in co-pending U.S. patent application Ser. No. 08/014, 700 filed on Feb. 8, 1993.

The braking system 20 further preferably includes connecting means, shown in the form of a manifold or piping 60, for connecting the master cylinder 30 with the brake lines 70. Although a manifold includes a pipe with several apertures, openings, or ports therein for making multiple connections, the term as used herein includes piping having three or more apertures for making a connection from one line to two or more other lines. FIG. 1 illustrates portions of the manifold 60 positioned in the housing 51 of the flow controller 50. The manifold 60 as illustrated includes a main port 61 in fluid communication with the piston chamber 32 of the master cylinder 30, and first and second auxiliary ports 63, 65 in fluid communication with the main port 61 and the respective inlet and outlet brake lines 71, 72. A main piping portion 62 is in fluid communication with the main port 61 and connects to first and second auxiliary piping portions 64, 66. The first and second auxiliary piping portions 64, 66, in turn, are in fluid communication with the respective first and second auxiliary ports 63, 65. The manifold 60 may have a generally T-shape configuration as illustrated, but may also include other configurations including the configuration more particularly illustrated in FIG. 7.

The manifold 60 is preferably positioned remote from the calipers 82, 92 and adjacent the master cylinder 30. As illustrated in FIG. 1, the housing 51 of the flow controller 50 having the first and second check valves 52, 56 positioned therein includes portions of the manifold 60. As illustrated by other embodiments of the invention as well, however, the manifold may be positioned within the housing 31 of the master cylinder 30, outside of the housing 31 of the master cylinder 30, within the housing 51 of the flow controller 50, or various combinations of the same.

The manifold 60 preferably has a predetermined volume less than the working volume of the piston 33, so that during operation of the vehicle braking system 20 the master cylinder 30 withdraws the working volume of hydraulic fluid from the manifold 60 and the outlet brake line 72 when the piston 33 moves from the extended to the retracted position so as to collect a portion of the returning fluid from the outlet brake line 72 in the piston chamber 32 and thereby permit gas contained therein to vent through the fluid reservoir 40.

The manifold 60 is preferably positioned closely adjacent the master cylinder 30, but may extend from the master cylinder 30 within about 30 inches thereof, i.e., depending on the diameter of the brake lines, fluid viscosity, distance of movement of the disk brake piston, and the like. The manifold 60 in combination with at least one check valve provides means for directing fluid flow from the master cylinder 50 through the inlet brake line 71 and for controlling fluid flow to the master cylinder 50 from the outlet brake line 72 during operation of the braking system 20. The distance between the manifold 51 having the first and second check valves 52, 56 positioned therein and the master cylinder 30 is preferably about 4 inches. As will be apparent to those skilled in the art, the positioning of the manifold 60 with respect to the master cylinder 30 may vary within the aforementioned 30 inches depending on the diameter of the brake lines, distance of movement of the disk brake piston, the diameter of the piston chamber, and the temperature, or type and hence the viscosity of the fluid within the system, and/or other related factors.

Figure 3:
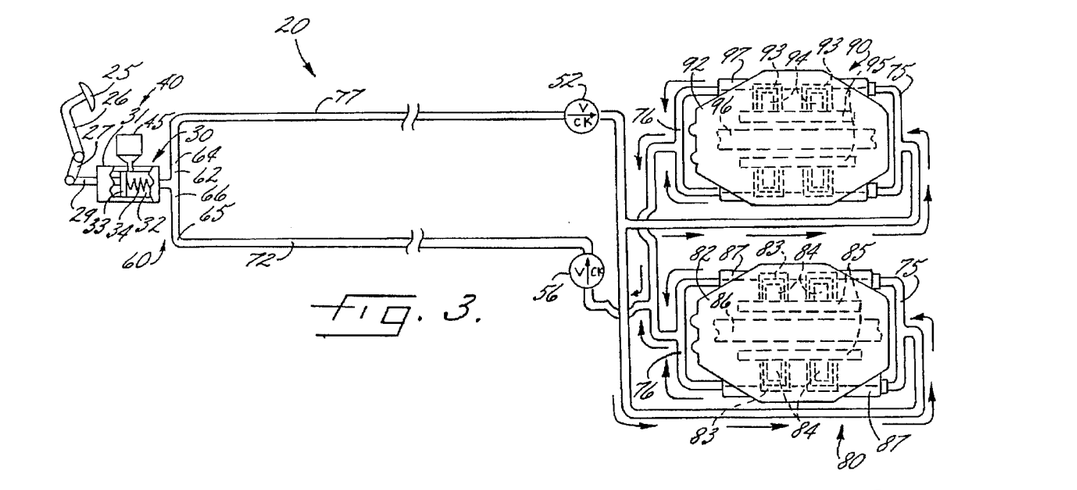
FIG. 3 is a schematic view of a vehicle braking system for a pair of disk brakes according to a second embodiment of the present invention.

FIG. 3 schematically illustrates a vehicle braking system 20 according to a second embodiment of the invention having a pair of disk brakes 80, 90 connected to inlet 71 and outlet 72 brake lines and to the first and second check valves 52, 56. In this embodiment, a portion of the manifold 60 and the first and second check valves 52, 56 are not positioned within the housing 51. The manifold 60 is positioned adjacent the master cylinder 30, but the first and second check valves 52, 56 are positioned relatively close to the calipers 82, 92.

Figure 4:
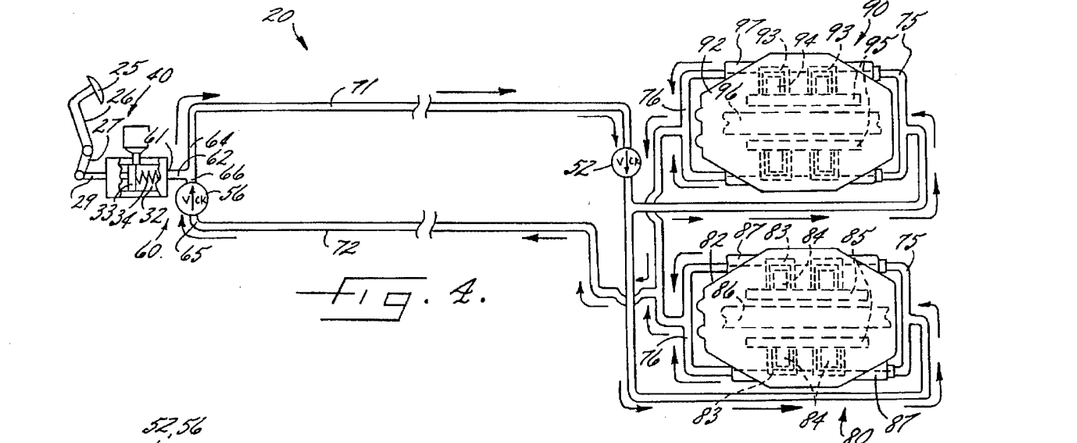
FIG. 4 is a schematic view of a vehicle braking system for a pair of disk brakes according to a third embodiment of a braking system of the present invention.

FIG. 4 shows a vehicle braking system 20 having two disk brakes 80, 90 connected to inlet 71 and outlet 72 brake lines and to the master cylinder 30 according to a third embodiment of the invention. As illustrated, the first check valve 52 is positioned relatively close to the calipers 82, 92 and the second check valve 56 is positioned relatively close to the master cylinder 30. The manifold 60, however, is positioned close to the master cylinder 30.

Figure 5:
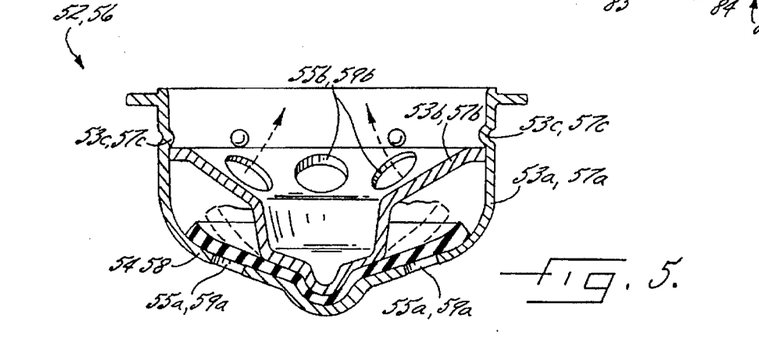
FIG. 5 is a vertical cross-sectional view of a diaphragm-type check valve of a braking system according to the present invention.

FIG. 5 illustrates a cross-sectional view of a type of check valve 52, 56 of a braking system 20 according to the present invention. According to the present invention, the diaphragm-type check valve 52, 56 is preferable for the braking system 20 because disk brakes function differently than drum brakes in vehicles. A check valve positioned in fluid communication with the brakes in a vehicle braking system provides a predetermined amount of residual pressure on the brakes of the vehicle. It is preferable, however, for disk brakes that no or a low residual pressure be provided by the check valve because too much residual pressure to the disk brakes can cause the brakes to overheat rapidly, cause the brakes to be damaged, and/or cause the braking system to be inoperative.

The diaphragm-type, or other low residual pressure type, of check valve 52, 56 in a braking system 20 of the present invention provides both a low residual pressure and the fluid flow restricting functions desired. The diaphragm-type check valve 52, 56 illustrated in FIG. 5 provides a low residual pressure of less than 0.25 pounds per square inch (PSI) when positioned in the brake lines 70. Many conventional racing vehicles include a braking system having brake caliper seals, i.e., o-rings, that fail to retract at approximately 0.25 PSI. Conventional passenger vehicles also include a braking system having a disk brake (such as shown in FIG. 8) with a seal seat that enables retraction at approximately 1 PSI. Accordingly, the diaphragm-type check valve 52, 56 has several advantages, i.e., low residual pressure, fluid restriction performance, and therefore is preferred for both of these vehicle systems. It will be apparent to those skilled in the art, however, that various other types of valves or check valves for fluid control may also be used, such as a customized ball-and-spring type check valve, vent valves, or other diaphragm-type check valves, for the present invention. It is intended that the present invention not be limited to the type of valve or check valve shown. According to the present invention, however, it is preferable that the check valve of the flow controller 50 provide residual pressure of less than about 1 PSI with conventional disk brakes, but conventional disk brake construction may also be modified such that a range of less than about 5 PSI may be acceptable.

As further shown by the cross-section of a check valve in FIG. 5, each check valve 52, 56 preferably has a first perforated member 53a, 57a having a plurality of openings 55a, 59a therein and a second perforated member 53b, 57b having a lesser plurality of openings 55b, 59b therein than the first perforated member 53a, 57a. The second perforated member 53b, 57b is matingly received by the first perforated member 53a, 53b and is secured in place by securing means shown as indentions 53c, 57c in the first perforated member 53a, 57a. Resilient means, shown in the form of an elastomeric member 54, 58, is positioned between the first 53a, 57a and second 53b, 57b perforated members and covers the plurality of openings 55a, 59a in the first perforated member 53a, 57a, so that fluid flow is prevented when flowing through the openings 55b, 59b of the second perforated member 53b, 57b toward the first perforated member 53a, 57a and is allowed when flowing through the openings 55a, 59a of the first perforated member 55a, 59a toward the second perforated member 53b, 57b (as best shown in phantom view in FIG. 5).

The elastomeric member 54, 58, illustrated as a rubber disk, of each of the first 52 and second 56 check valves has a medial portion thereof fixed between medial portions of the first 53a, 57a and second 53b, 57b perforated members so that peripheral portions of the elastomeric member 54, 58 cover the plurality of openings 55a, 59a in the first perforated member 53a, 57a. The first perforated member 53a, 57a of each of the first 52 and second 56 check valves also has an outward flange at the base of the generally dome-shape member for positioning the check valves 52, 56 to cooperate within the brake lines 70, housing 51 of the flow controller 50, or the like of a brake system 20 according to the various embodiments of the invention.

Figure 12A:
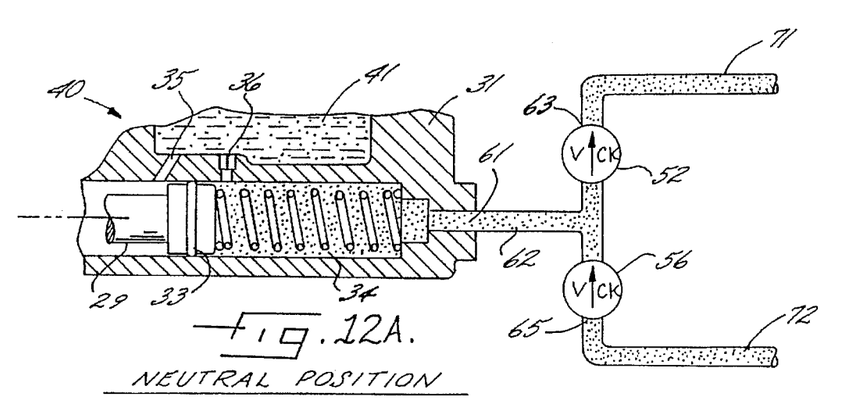
FIGS. 12A–12C are fragmentary schematic views of a braking system according to the present invention illustrating the purging of gas from the brake lines thereof.
Figure 12B:
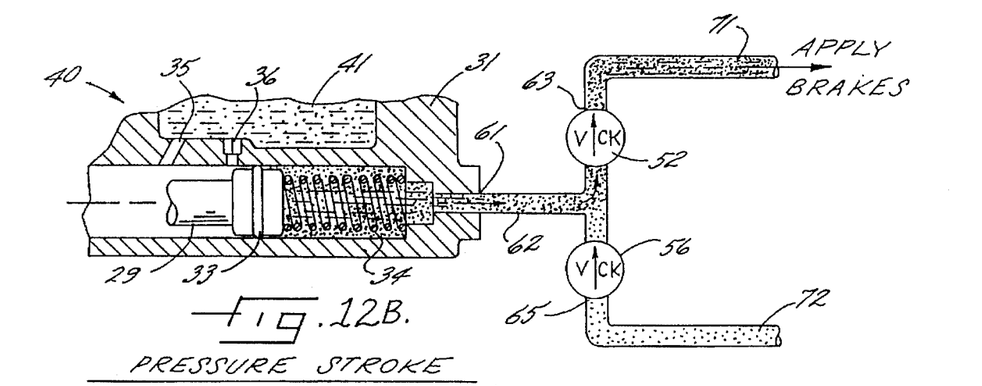
Figure 12C:
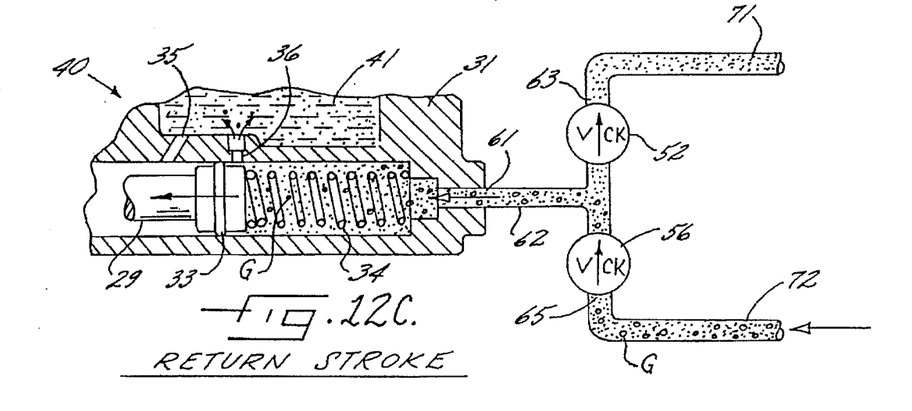

A braking system 20 of the invention in operation, as best shown in FIGS. 1-2 and 12A-12C, is such that a hydraulically operated disk brake, such as one of the disk brakes 80, 80', or 90 illustrated herein, generates heat during operation when, for example, being heavily used. The generation of heat causes the fluid in and around the caliper 82 to boil and emit vapor therefrom, i.e., causing gas or air in the braking system 20. As illustrated in FIGS. 12A-12C, the brake lines 70 as described are preferably positioned so that gas G in the lines 70 is urged toward and along the outlet brake line 72 from an upper portion of the caliper 82. The flow controller 50 connected in fluid communication with the inlet and outlet brake lines 71, 72 controls fluid flow so as to circulate flow from the disk brake 80 to the piston chamber 32 from the outlet brake line and restrict flow from the disk brake 80 to the inlet brake line 71 during operation of the braking system 20. The manifold 60 has a predetermined volume less than the working volume of the piston 33 so that during release of the brake pedal 25 by the driver of the vehicle the master cylinder 30 withdraws the working volume of hydraulic fluid from the manifold 60 and the outlet brake line 72 when the piston 33 moves from the extended to the retracted position.

This movement of the piston 33 preferably causes the master cylinder 30 to collect a portion of the returning fluid from the outlet brake line 72 into the piston chamber 32 and thereby permit gas G contained therein to vent through the compensating port 36 in fluid communication therewith. The gas G then passes from the compensating port 36 to the main fluid chamber 41 of the fluid reservoir 40. The gas G, air, or the like is then either vented to atmosphere if the embodiment of the fluid reservoir 40 is vented or stored in a gas or air pocket in the main fluid chamber 41 if the fluid reservoir 40 is not vented.

Figures 6, 6A, 7:
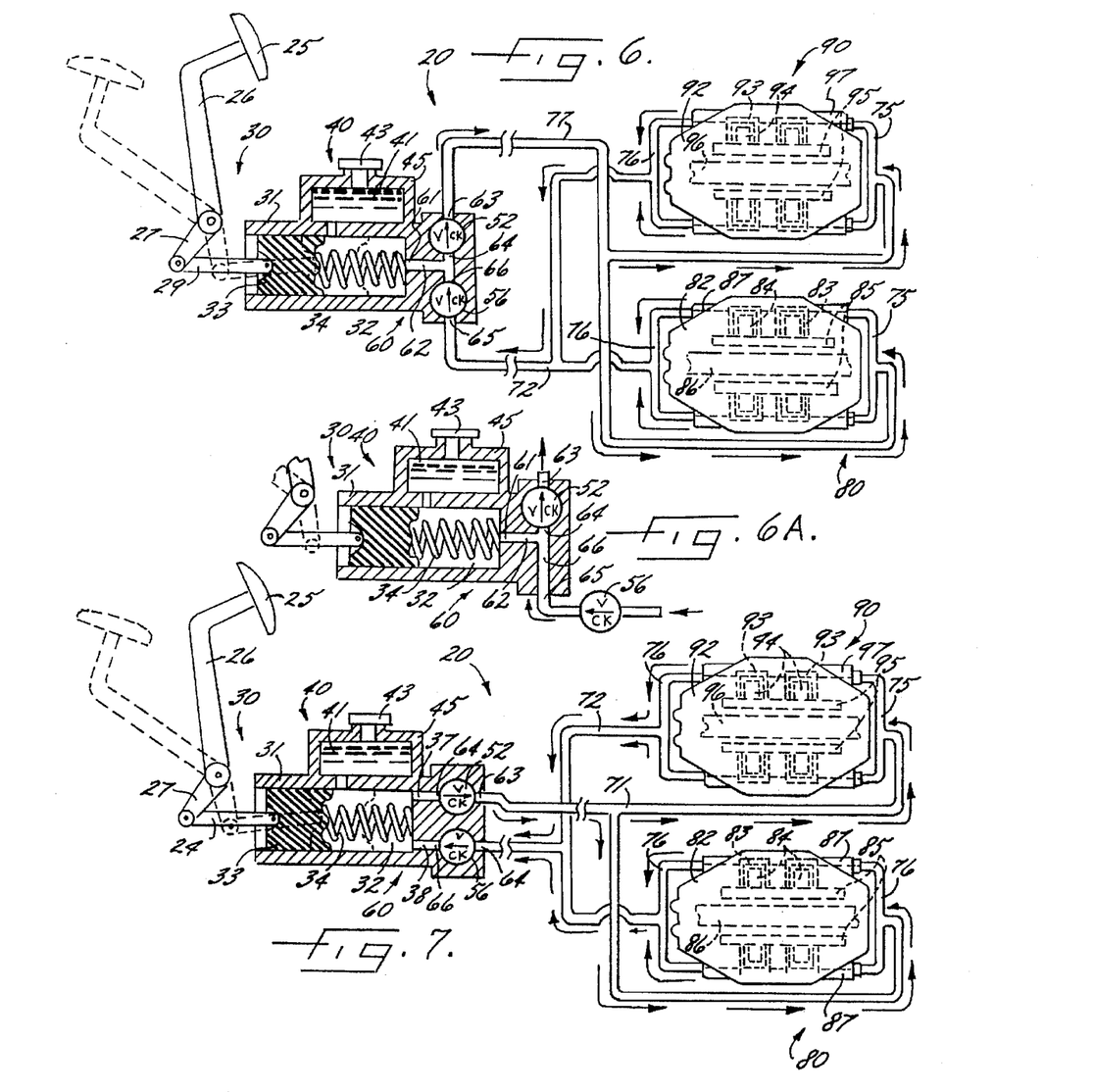
FIG. 6 is a vertical cross-sectional view of a master cylinder having a pair of check valves positioned therein according to a fourth embodiment of a braking system of the present invention.
FIG. 6A is a fragmentary cross-sectional view of a master cylinder having only one check valve positioned therein according to a fifth embodiment of a braking system of the present invention.
FIG. 7 is a vertical cross-sectional view of a master cylinder having a pair of check valves positioned therein according to a sixth embodiment of a braking system of the present invention.

FIGS. 6-7, 9-11, and 13 further schematically illustrate various other embodiments of a vehicle braking system according to the present invention. These various other embodiments illustrate other positions of the manifold 60, the brake lines 70, and the flow controller 50 according to the present invention. FIG. 6 schematically illustrated a braking system 20 including a vertical cross-sectional view of a master cylinder 30 having the manifold 60 with the first and second check valves 52, 56 positioned therein according to a fourth embodiment of a braking system 20. FIG. 6A is a fragmentary view of a braking system 20 including a cross-sectional view of a master cylinder 30 having the manifold 60 with only the first check valve 52 positioned therein according to a fifth embodiment of the present invention. The second check valve 56 as illustrated may be positioned in the brake lines 70 and outside of the housing 31 of the master cylinder 30.

FIG. 7 illustrates a schematic view of a braking system 20 including a vertical cross-sectional view of a master cylinder 30 having the manifold 60 and the first and second check valves 52, 56 positioned therein according to a sixth embodiment of the present invention. This embodiment also illustrates another configuration of the manifold 60. The main piping portion 62 of the manifold 60 is not illustrated in this embodiment and is effectively included in this configuration by the positioning of the first and second auxiliary piping portions 64, 66 with respect to the piston chamber 32 of the master cylinder 30. The first and second auxiliary piping portions 64, 66 are in fluid communication with the respective first and second auxiliary ports 63, 65 which are illustrated as ports into the housing 31 of the master cylinder 30.

Figure 9:
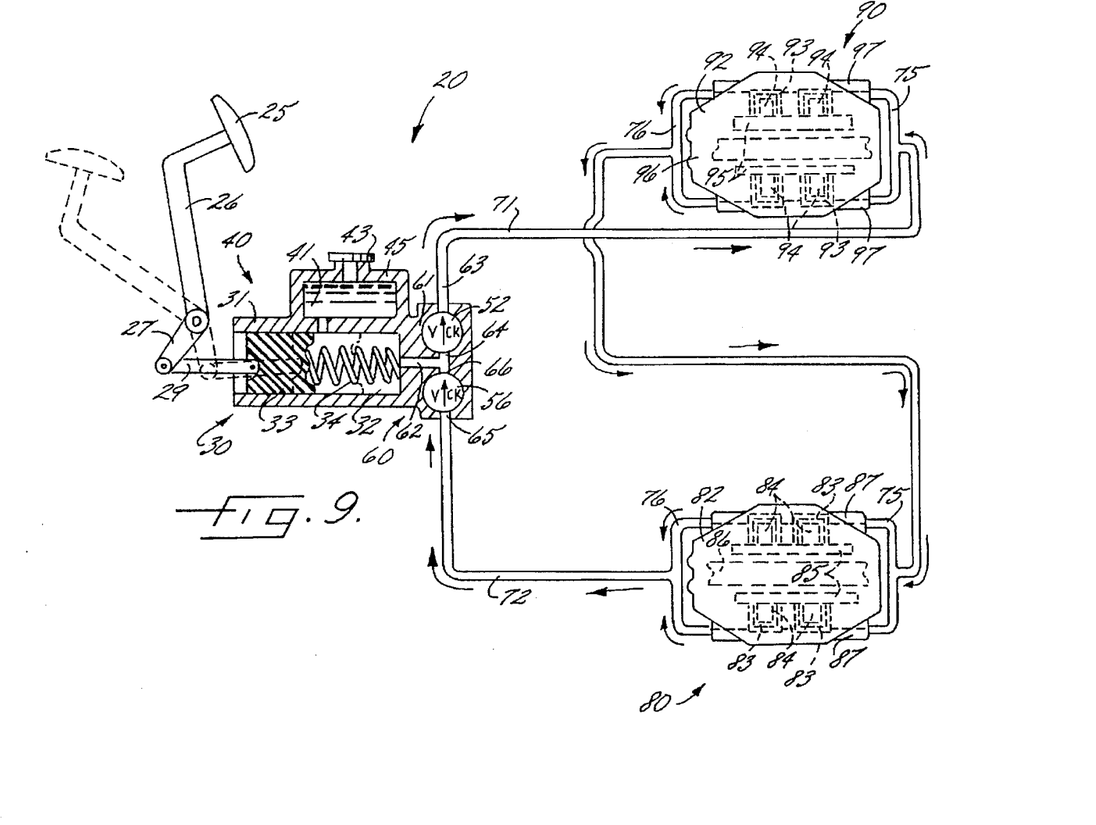
FIG. 9 is a schematic view of a braking system according to a seventh embodiment of the present invention.

FIG. 9 is a schematic view of a braking system 20 according to a seventh embodiment of the present invention. This embodiment illustrates another connecting configuration of the brake lines 70 with the pair of disk brakes 80, 90. The inlet and outlet brake lines 71, 72 are connected to the calipers 82, 92 in a general T-shape configuration, i.e., like other embodiments illustrate, so that the outlet brake line 72 from one caliper 92 connects to the inlet brake line 71 of the other caliper 82 without first being connected to or positioned adjacent the master cylinder 30.

Figure 10:
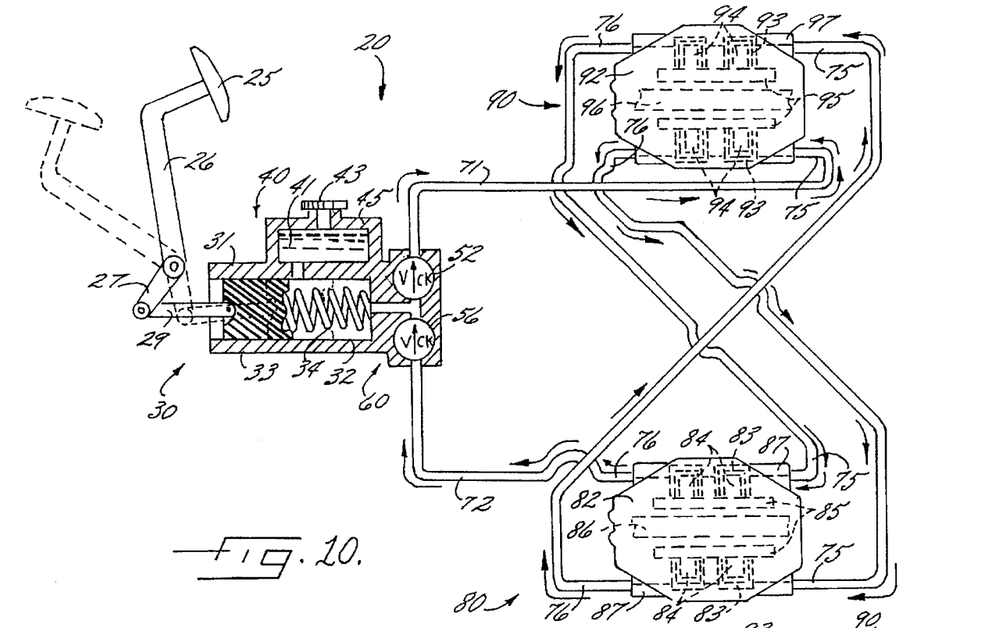
FIG. 10 is a schematic view of a braking system according to an eighth embodiment of the present invention.
Figure 11:
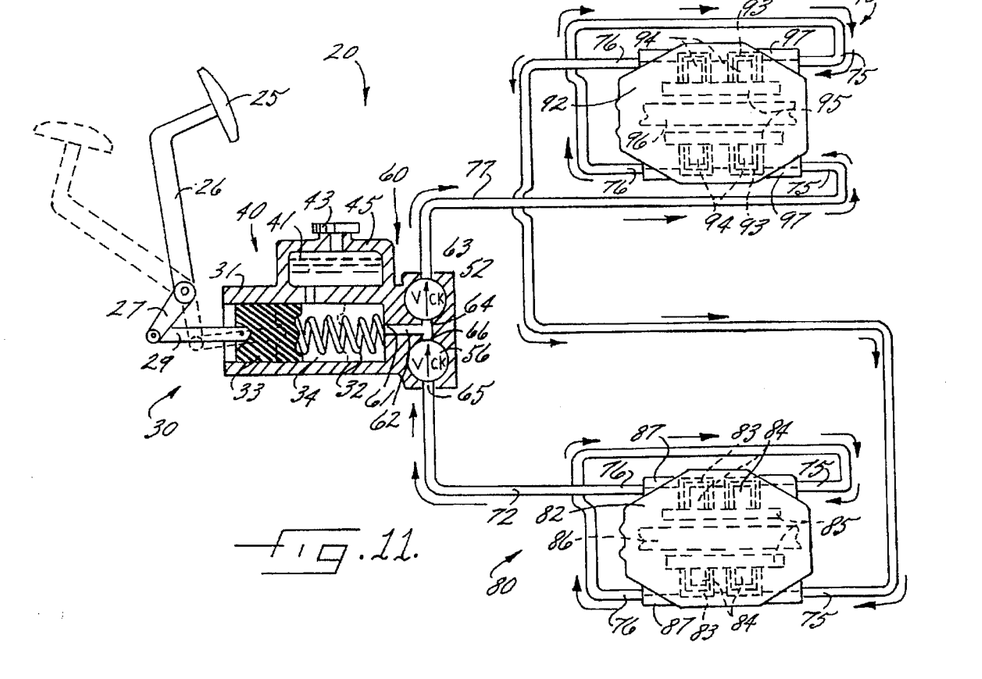
FIG. 11 is a schematic view of a braking system according to a ninth embodiment of the present invention.

FIGS. 10–11 are schematic views of a braking system 20 according to an eighth embodiment and a ninth embodiment of the present invention. These views also further illustrate other connecting configurations of the brake lines 70 with the pair of disk brakes 80, 90. The inlet and outlet brake lines 71, 72 are configured and connected to the calipers 82, 92 so that fluid passes through only one side of the caliper 82, 92 at a time, but preferably still pass from the lower portion of the caliper 82, 92 to the upper portion thereof.

FIG. 13 is a schematic view of a braking system 20 according to a tenth embodiment of the present invention. This embodiment illustrates yet another connecting configuration of the brake lines 70 with a pair of disk brakes 80, 90. The inlet and outlet brake lines 71, 72 are preferably positioned so that the brake fluid passes through the outside of the calipers 82, 92 to provide increased cooling of these portions of the calipers 82, 92 which may receive more intense heat during driving of the vehicle. This embodiment also illustrates calipers 82, 92 having six cylinders 83, 93 and six corresponding pistons positioned within these cylinders 84, 94.

In the drawings and specification, there has been disclosed illustrated embodiments of the invention, and although specific terms are employed, they are used in a generic and descriptive sense only and not for the purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed is:

1. A self-purging vehicle braking system comprising:
    a hydraulically operated disk brake generating heat during operation thereof;
    a master cylinder in fluid communication with said disk brake, said master cylinder comprising a piston chamber having a compensating port, a piston disposed within said piston chamber and moveable between an extended and a retracted position and defining a working volume of fluid moved by said piston, and a fluid reservoir in fluid communication with said compensating port of said piston chamber and adapted to supply fluid thereto;
    a manifold connected in fluid communication with said piston chamber;
    an inlet brake line interconnecting said disk brake to said manifold for supplying brake fluid to said disk brake;
    an outlet brake line interconnecting said disk brake to said manifold for returning fluid from said disk brake, the returning fluid having gas therein produced by heat from operation of said disk brake; and
    flow control means connected in fluid communication with said inlet and outlet brake lines for controlling fluid flow so as to circulate returning fluid having gas therein from said disk brake through said outlet brake line and to said piston chamber during operation of the braking system as said piston is moved between the extended and retracted positions, said flow control means providing a low residual pressure in said respective inlet and outlet brake lines;
    said manifold having a predetermined volume less than said working volume of said piston so that said master cylinder withdraws the working volume of hydraulic fluid from said manifold and said outlet brake line when said piston moves from the extended to the retracted position so as to collect a portion of the returning fluid from said outlet brake line in the piston chamber and thereby permit gas contained therein to vent through said fluid reservoir.

2. A self-purging vehicle braking system as defined in claim 1, wherein said flow control means comprises first and second valve means in fluid communication with said brake lines, said first valve means being positioned for restricting fluid flow from said piston chamber of said master cylinder only through said inlet brake line and said second valve means being positioned for restricting fluid flow to said master cylinder only from said outlet brake line.

3. A self-purging vehicle braking system as defined in claim 2, wherein each of said first and second valve means comprises a check valve, said check valve including a perforated member and an elastomeric member positioned in fluid communication with and cooperating with said perforated member to allow fluid flow in only one direction therethrough.

4. A self-purging vehicle braking system as defined in claim 2, wherein each of said first and second valve means comprises a check valve, said check valve including first and second perforated members and an elastomeric member positioned between said first and second perforated members so as to allow fluid flow in only one direction therethrough.

5. A self-purging vehicle braking system as defined in claim 1, wherein said manifold comprises piping including a main port in fluid communication with said piston chamber and first and second auxiliary ports in fluid communication with said brake caliper, said first auxiliary port being positioned for fluid flow from said piston chamber, through said main port of said piping, through said first auxiliary port, through said inlet brake line, and to a lower portion of said brake caliper, said second auxiliary port being positioned for fluid flow from an upper portion of said brake caliper, through said outlet brake line, through said second auxiliary port, through said main port, and to said piston chamber.

6. A self-purging vehicle braking system as defined in claim 1, wherein said manifold is positioned outside of and adjacent to said master cylinder of the braking system.

7. A method of purging gas from brake lines of a vehicle braking system comprising a master cylinder having a piston chamber having a compensating port, a piston disposed within said piston chamber and moveable between an extended and a retracted position and defining a working volume of fluid moved by said piston, a fluid reservoir in fluid communication with the compensating port of the master cylinder and positioned to supply brake fluid to the master cylinder, a disk brake including a caliper, inlet and outlet brake lines positioned for providing fluid communication respectively from the master cylinder to the caliper and from the caliper to the master cylinder, a manifold fluidly connected to the inlet and outlet brake lines and the master cylinder, and a flow controller fluidly connected to the manifold and at least the outlet brake line, the flow control means providing a low residual pressure, the method comprising:

circulating fluid from the master cylinder, through the manifold, only through the inlet brake line, through the caliper of the disk brake, to the outlet brake line; through the flow controller, through the manifold, and to the inlet brake line;

directing gas from the caliper, only through the outlet brake line, through the flow controller, through the manifold, to the master cylinder, and from the master cylinder, through the compensating port, and to the fluid reservoir connected thereto:

displacing a predetermined working volume of fluid from the master cylinder; and returning the predetermined volume of fluid to the master cylinder and thereby including gas received from the caliper therewith.

* * * * *